(12) United States Patent
Ericksen et al.

(10) Patent No.: US 6,874,696 B1
(45) Date of Patent: Apr. 5, 2005

(54) ADJUSTABLE SPRINKLER RISER WITH OFFSET JOINT

(75) Inventors: Kent C. Ericksen, Bountiful, UT (US); Craig J. Madson, Salt Lake City, UT (US)

(73) Assignee: Orbit Irrigation Products, Inc., Bountiful, UT (US)

( * ) Notice: Subject to any disclaimer, the term of this patent is extended or adjusted under 35 U.S.C. 154(b) by 74 days.

(21) Appl. No.: 10/601,430

(22) Filed: Jun. 23, 2003

(51) Int. Cl.[7] .................. B05B 17/00; B05B 15/06; A01G 25/06; F16L 15/02; F16L 27/12
(52) U.S. Cl. .................. 239/1; 239/200; 239/201; 239/281; 285/302
(58) Field of Search ............... 239/1, 200, 201, 239/281, 202–209, 280, 280.5, 266; 285/302, 285/303, 342, 343

(56) References Cited

U.S. PATENT DOCUMENTS

| | | | |
|---|---|---|---|
| 782,552 A | 2/1905 | Glauber | |
| 1,833,040 A | 11/1931 | Rader | |
| 3,083,914 A | 4/1963 | Smith et al. | |
| 3,369,828 A * | 2/1968 | Trickey | 285/119 |
| 3,563,575 A * | 2/1971 | Sanford | 285/323 |
| 4,007,877 A | 2/1977 | Jackson et al. | |
| 4,099,670 A * | 7/1978 | Cole et al. | 239/205 |
| 4,274,592 A | 6/1981 | Westhusin | |
| 4,519,544 A | 5/1985 | Szabo | |
| 4,643,523 A | 2/1987 | Smedley et al. | |
| 4,886,304 A * | 12/1989 | Kunsman | 285/104 |
| 5,133,501 A | 7/1992 | Marshall | |
| 5,996,905 A * | 12/1999 | Bedford | 239/204 |
| 6,193,168 B1 * | 2/2001 | Bedford | 239/204 |

* cited by examiner

Primary Examiner—David A. Scherbel
Assistant Examiner—Darren Gorman
(74) Attorney, Agent, or Firm—Madson & Metcalf

(57) ABSTRACT

The adjustable sprinkler riser includes an outer and an inner telescoping member that telescopically interface with each other. A protrusion is spaced from a proximal end of the outer telescoping member. A first joint member slidably interfaces with the outer telescoping member, and a second joint member slidably interfaces with the inner telescoping member. The second joint member may be selectively secured to the first joint member to restrict movement of the inner telescoping member relative to the outer telescoping member. In such a condition, areas of vulnerability to breakage in the joint members and inner telescoping member are offset from each other to provide greater strength to the adjustable sprinkler riser. In addition, manufacturing the adjustable sprinkler riser is simple because the first and second joint members may be conveniently placed on the telescoping members, and there is no need to form threads or other intricate structures on the telescoping members.

27 Claims, 4 Drawing Sheets

ADJUSTABLE SPRINKLER RISER WITH OFFSET JOINT

1. Field of the Invention

The present invention relates to a sprinkler riser. More specifically, this invention relates to an adjustable sprinkler riser.

2. Description of Related Art

A conventional sprinkler riser includes a first attachment mechanism for attaching the riser to a sprinkler system, an intermediary elongated section, and a second attachment mechanism for attaching the riser to a sprinkler head. Conventional sprinkler risers provide substantial advantages to their users. With a sprinkler riser, certain areas of a lawn or garden may be watered without repositioning underground piping. Furthermore, a stream of water may be emitted over a wall, bush, small tree, or shrubbery to a desired location.

Unfortunately, conventional sprinkler risers suffer from at least one key limitation: the height of the sprinkler riser cannot be easily adjusted. For instance, if the sprinkler riser emits water over a bush and the bush grows such that the bush obstructs the path of the emitted water, the user is required to expend a considerable amount of time to reinstall a new elongated section in order to project the water over the bush. Anyone who has ever made adjustments to a sprinkler system can appreciate the amount of time and frustration that may accompany such a procedure.

Adjustable sprinkler risers have been developed to overcome this limitation. These sprinkler risers permit a user to adjust the height of the sprinkler riser without removing the old sprinkler riser, or the elongated section of the sprinkler riser, and installing a new, longer riser.

Unfortunately, these conventional adjustable risers also suffer from a number of key disadvantages. First, conventional adjustable sprinkler risers are often fragile and can easily break. This is because a joint between its extensible members is often not strong enough to withstand the forces that may be applied to it. Because of the length of the extensible members, significant force may be applied to the joint between the extensible members from a seemingly minor impact, particularly if the impact is delivered to one of the extremities of the extensible members. Furthermore, until the sprinkler riser is repaired, the associated sprinkler station, or even the entire sprinkler system, can become nonfunctional.

Second, manufacturing of conventional adjustable sprinkler risers is often relatively complex and thus inordinately expensive. Competition in the sprinkler industry is fierce and profit margins are slim. As a consequence, advances that result in price decreases on specific products can provide a significant competitive advantage to participants in the sprinkler industry.

Consequently, it would be an advancement in the art to provide an adjustable sprinkler riser with a more durable joint region than conventional adjustable sprinkler risers. It would be a further advancement to provide such a sprinkler riser that involves a simple manufacturing process and is thus less expensive to manufacture than conventional adjustable sprinkler risers.

SUMMARY OF THE INVENTION

The apparatus and method of the present invention have been developed in response to the present state of the art, and in particular, in response to problems and needs in the art that have not yet been fully resolved by currently available sprinkler risers. More specifically, the adjustable sprinkler riser is more durable than conventional adjustable sprinkler risers. The adjustable sprinkler riser also involves a simple manufacturing process and thus is less expensive to manufacture than conventional adjustable sprinkler risers.

The adjustable sprinkler riser includes an outer telescoping member that telescopically interfaces with an inner telescoping member. The inner telescoping member is at least partially disposed within a first interior channel defined by the outer telescoping member.

The adjustable sprinkler riser also includes a first and second joint member. The first joint member slidably interfaces with the outer telescoping member, while the second joint member slidably interfaces with the inner telescoping member.

The first joint member includes an engagement end. The second joint member has a thin-walled section having a remote boundary. The engagement end of the first joint member is dimensioned to receive the thin-walled section of the second joint member. The second joint member is shaped such that the engagement end of the first joint member cannot move beyond the remote boundary of the thin-walled section of the second joint member. In one embodiment, threads on the thin-walled section of the second joint member mate with threads on the first joint member to secure the second joint member to the first joint member.

A pinching seal has an interior aperture and slidably interfaces with the inner telescoping member. The pinching seal is positioned on the inner telescoping member between the second joint member and a concealed end of the inner telescoping member. The pinching seal is sized to be received by, or slide into, an expanded section of the second joint member.

The pinching seal may include a separate O-ring and pinching member or, alternatively, may be an integrated piece. The O-ring may have a round cross sectional shape and may be made from rubber. The O-ring is designed to be pressed at least partially into an opening formed where the inner telescoping member protrudes from the first interior channel of the outer telescoping member. Accordingly, the O-ring limits fluid leakage from the opening.

The pinching member is shaped to interface with the expanded section of the first joint member. When pressure is applied by the second joint member, the pinching member constricts or pinches the inner telescoping member, as will be described in greater detail below. The pinching member may include an inclined exterior surface and a series of projections that are oriented toward the second joint member. Those skilled in the art will recognize that other designs of the pinching member come within the scope of this invention and perform the function described above.

A protrusion is positioned on the outer telescoping member and is spaced from a proximal end of the outer telescoping member. The protrusion is wider than an outer surface of the outer telescoping member, but is narrower than and thus may be disposed within a wide region of the first joint member. Because the protrusion is wider than a narrow region of the first joint member, the protrusion engages, or contacts, the first joint member and limits its movement toward the proximal end of the outer telescoping member.

When the second joint member is secured to the first joint member, the first joint member engages the protrusion and pulls the second joint member and pinching seal toward the proximal end of the outer telescoping member. The O-ring of the pinching seal is pressed into the opening formed where the inner telescoping member protrudes from the first interior channel of the outer telescoping member to limit fluid leakage from the opening. The second joint member constricts the pinching member, which, in turn, constricts the inner telescoping member. As a result, when the first and second joint members are secured together, movement of the inner telescoping member relative to the outer telescoping member is restricted. The first and second joint members, when secured to each other, may be referred to as a combined joint.

One advantage of the adjustable sprinkler riser is its strength or resistance to breakage. The inner telescoping member is most vulnerable to breakage where it contacts the proximal end of the outer telescoping member. A blow to the inner telescoping member, particularly near an exposed end of the inner telescoping member, can apply significant force to this area of vulnerability to breakage. The combined joint is particularly vulnerable to breakage at an exposed segment of the second joint member between the engagement end of the first joint member and the remote boundary of the thin-walled section of the second joint member. Furthermore, if the second joint member breaks, a portion of the second joint member will likely remain in the first joint member, thus requiring replacement of the entire riser to repair the problem.

It is advantageous to offset the area of vulnerability to breakage of the inner telescoping member from the exposed segment of the second joint member. To be more particular, when the second joint member is secured to the first joint member such that the position of the inner telescoping member relative to the outer telescoping member is secured, the exposed segment of the second joint member is offset from the proximal end of the outer telescoping member. In certain embodiments, an offset between the engagement end of the first joint member and exposed segment is at least an eighth or a quarter of an inch.

In this application, offset means that an imaginary plane projected away from the proximal end of the outer telescoping member does not intersect with the exposed segment of the second joint member. The imaginary plane is perpendicular to a longitudinal axis of the sprinkler riser.

In other embodiments, the protrusion is positioned on the outer telescoping member such that the engagement end of the first joint member is prevented from extending to the proximal end of the outer telescoping member. In such an embodiment, the engagement end of the first joint member is prevented from passing through or even intersecting with the imaginary plane projected away from the proximal end of the outer telescoping member. In certain designs of the adjustable sprinkler riser in which the engagement end of the first joint member is prevented from extending to the proximal end, the exposed segment of the second joint member is offset from the proximal end of the outer telescoping member when the second joint member is secured to the first joint member such that the position of the inner telescoping member relative to the outer telescoping member is secured. Thus, the exposed segment of the second joint member is positioned between the proximal end and the distal end of the outer telescoping member. The offset between the exposed segment of the second joint member and proximal end may be at least an eighth or a quarter of an inch in certain such embodiments.

The adjustable sprinkler riser includes a first threaded interface that is positioned on and attached to a distal end of the outer telescoping member. The first threaded interface has threads and is used to secure the sprinkler riser to a sprinkler system. The second threaded interface is attached to the exposed end of the inner telescoping member and is used to secure the sprinkler riser to a sprinkler head.

The adjustable sprinkler riser involves a simple manufacturing process. The protrusion is formed on the outer telescoping member. The protrusion may be a ridge integrally formed with the outer telescoping member. Alternatively, the protrusion may be formed by placing an open-ended ring in a recess defined by the outer surface of the outer telescoping member.

The first joint member is placed on the outer telescoping member over the distal end thereof such that it slidably interfaces with the outer telescoping member. The first threaded interface is then attached to the distal end of the outer telescoping member. A range of motion of the first joint member relative to the outer telescoping member is thus bounded by the first threaded interface and the protrusion on the outer telescoping member.

The pinching seal is placed on the inner telescoping member such that it slidably interfaces with the inner telescoping member. The second joint member is placed on and slidably interfaces with the inner telescoping member. The second threaded interface is attached to the exposed end of the inner telescoping member. The inner telescoping member is positioned within the first interior channel of the outer telescoping member such that the outer and inner telescoping members telescopically interface. Those skilled in the art will recognize that the order of performing the foregoing steps may be varied within the scope of this invention.

In view of the foregoing, the adjustable sprinkler riser provides substantial advantages over conventional risers. When a position of the inner telescoping member relative to the outer telescoping member is secured, areas of vulnerability to breakage in the joint members and inner telescoping member are offset from each other to provide greater strength to the adjustable sprinkler riser. Also, the adjustable sprinkler riser involves a simple manufacturing process and is thus less expensive to manufacture than conventional adjustable risers.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–4, wherein like parts are designated by like numerals throughout. The members of the present invention, as generally described and illustrated in the Figures, may be designed in a wide variety of configurations. Thus, the following more detailed description of the embodiments of the present invention, as represented in the Figures, is not intended to limit the scope of the invention, as claimed, but is merely representative of presently preferred embodiments of the invention.

Figure 1:
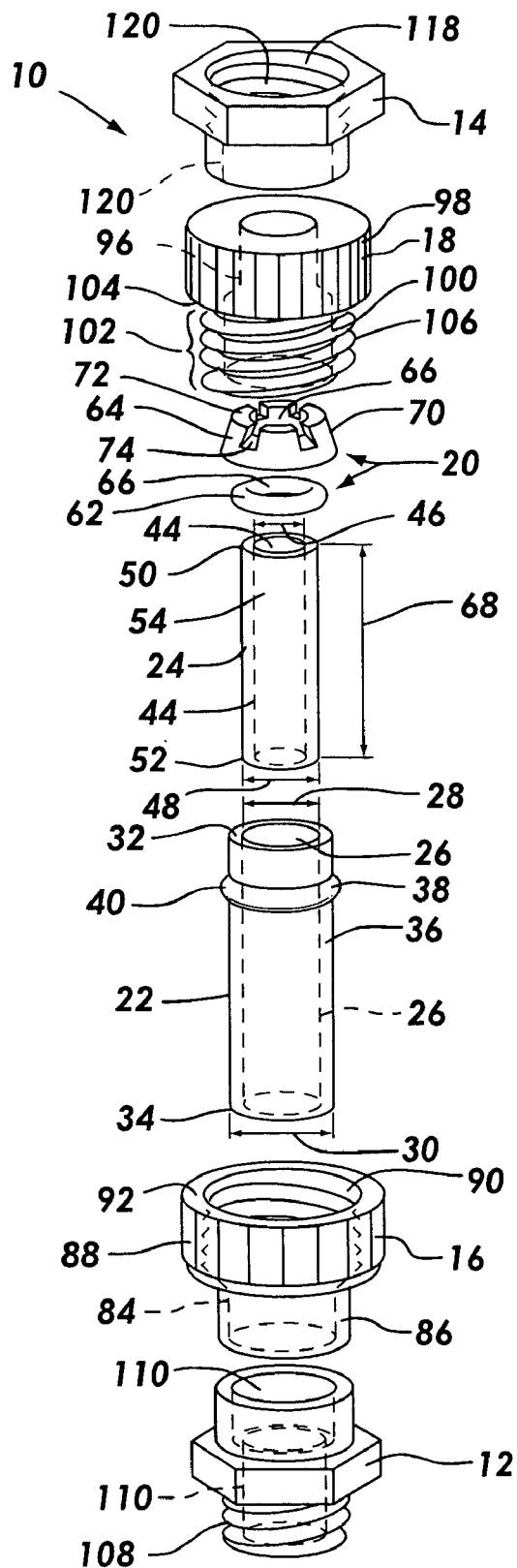
FIG. 1 is an exploded view of an adjustable sprinkler riser.

With reference to FIG. 1, there is shown an exploded view of the adjustable sprinkler riser 10. In overview, the adjustable sprinkler riser 10 includes a first threaded interface 12, a second threaded interface 14, a first joint member 16, a second joint member 18, a pinching seal 20, an outer telescoping member 22, and an inner telescoping member 24. Each of these components and its function in the adjustable sprinkler riser 10 will be explained below.

The outer telescoping member 22 is hollow and, accordingly, defines a first interior channel 26. Thus, the outer telescoping member 22 has an inner diameter 28, which is the diameter of the first interior channel 26, and an outer diameter 30. The outer telescoping member 22 also has a proximal end 32, a distal end 34, and an outer surface 36.

A protrusion 38 is formed on the outer surface 36. The protrusion 38 has a diameter greater than the outer diameter 30 of the outer telescoping member 22. As illustrated, the protrusion 38 is a continuous ridge 40 that extends around the outer surface 36. Alternatively, the protrusion 38 could include one or more discrete projections (not shown) extending away from the outer surface 36. The protrusion 38 is spaced from the proximal end 32 of the outer telescoping member 22.

The inner telescoping member 24 defines a second interior channel 44 and, consequently, has an internal diameter 46 and an external diameter 48. The inner telescoping member 24 also has an exposed end 50, a concealed end 52, and an external surface 54.

The inner telescoping member 24 can be positioned within the first interior channel 26 of the outer telescoping member 22 such that the inner telescoping member 24 telescopically interfaces with the outer telescoping member 22. The external diameter 48 of the inner telescoping member 24 is less than or approximately equal to the inner diameter 28 of the outer telescoping member 22 to provide a snug, but telescopically slidable fit between the telescoping members 22, 24.

When the inner telescoping member 24 telescopically interfaces with the outer telescoping member 22, the concealed end 52 of the inner telescoping member 24 is disposed within the first interior channel 26, while the exposed end 50 of the inner telescoping member 24 is disposed outside of the first interior channel 26. In such a condition, the inner telescoping member 24 protrudes out of the proximal end 32 of the outer telescoping member 22. By altering how much of the inner telescoping member 24 is positioned within the outer telescoping member 22, the height of the adjustable sprinkler riser 10 can be adjusted by an end-user.

The illustrated pinching seal 20 includes two physically separate components: a O-ring 62 and a pinching member 64. Alternatively, the O-ring 62 and pinching member 64 may be integrated into a single physical component. The O-ring 62 and pinching member 64 each include an interior aperture 66. The interior aperture 66 is approximately the same size or slightly larger than the external surface 54 of the inner telescoping member 24 such that the O-ring 62 and pinching member 64 may be placed on and fit snugly, but slidably, around the inner telescoping member 24. When placed on the inner telescoping member 24, the O-ring 62 and pinching member 64 slidably interface with the external surface 54 of the inner telescoping member 24 and, thus, are selectably positionable along a length 68 of the inner telescoping member 24.

The illustrated O-ring 62 has a circular cross-sectional shape, but may include a washer having, for example, square, rectangular or octagonal cross-sectional shapes. The O-ring 62 is made from a flexible material, such as rubber, and is designed to prevent fluid leakage, as will be explained below.

The depicted pinching member 64 has an inclined exterior surface 70 that engages the second joint member 18, as will be discussed in detail below. The pinching member 64 also includes a series of projections 72. The projections 72 are oriented toward the second joint member 18 when the sprinkler riser 10 is assembled.

The first joint member 16 defines a bi-level internal chamber 84. The bi-level internal chamber 84 is defined by a narrow region 86 and a wide region 88 of the first joint member 16. The narrow region 86 is sized to be placed on and slidably interface with the outer surface 36 of the outer telescoping member 22. The wide region 88 is spaced away from the outer surface 36 when the first joint member 16 is disposed on the outer telescoping member 22. The wide region 88 includes a first set of threads 90 mateable with the second joint member 18, as will be explained below. The first set of threads 90 may be inwardly or outwardly oriented. When the first joint member 16 is positioned on the outer telescoping member 22, an engagement end 92 of the first joint member 16 is oriented toward the proximal end 32 of the outer telescoping member 22.

The second joint member 18 defines a stepped internal chamber 96. The stepped internal chamber 96 is defined by a constricted section 98 and an expanded section 100 of the second joint member 18. The constricted section 98 is sized to be placed on and slidably interface with the inner telescoping member 24 and, thus, is slightly larger than or approximately the same size as the external surface 54 of the inner telescoping member 24. The expanded section 100 is slightly wider than the external diameter 48 of the inner telescoping member 24 and is also wider than the pinching seal 20. Thus, when the second joint member 18 is disposed on the inner telescoping member 24, the pinching seal 20 may be positioned within the expanded section 100.

The second joint member 16 also includes a thin-walled section 102. The engagement end 88 of the first joint member 16 is dimensioned to receive the thin-walled section 102. More specifically, the wide region 88 of the first joint member 16 receives the thin-walled section 102 at the engagement end 93 of the first joint member 16. The thin-walled section 102 of the second joint member 16 has remote boundary 104. The second joint member 18 is shaped such that the engagement end 92 of the first joint member 16 cannot move beyond the remote boundary 104 of the thin-walled section 102 of the second joint member 18.

A second set of threads 106 is disposed on the expanded section 100 and, more particularly, on the thin-walled section 102 of the second joint member 16. The second set of threads 106 mate with the first set of threads 90 on the first joint member 16 to secure the second joint member 18 to the first joint member 16. Of course, as will be understood by those skilled in the art, other mechanisms may be used to secure the first and second joint members 16, 18 together, such as a latch and hook system (not shown).

The first threaded interface 12 can be positioned on and attached to the distal end 34 of the outer telescoping member 22 using, for example, adhesives, mating threads, sonic welding, or the like (not shown). As used in this application, the phrase "attached to" refers to any form of mechanical coupling that restricts relative translation or rotation between the attached objects. A third set of threads 108 is disposed on the first threaded interface 12. The third set of threads 108 is used to secure the sprinkler riser 10 to a sprinkler system (shown in FIG. 3). The first threaded interface 12 defines a third interior channel 110. When the first threaded interface 12 is attached to the outer telescoping member 22, the third interior channel 110 is in fluid communication with the first interior channel 26 of the outer telescoping member 22.

The second threaded interface 14 can be positioned on and attached to the exposed end 50 of the inner telescoping member 24, again using, for example, adhesives, mating threads, sonic welding, or the like (not shown). A fourth set of threads 118 on the second threaded interface 14 is used to secure the sprinkler riser 10 to a sprinkler head (shown in FIG. 3). The second threaded interface 14 defines a fourth interior channel 120, which is in fluid communication with the second interior channel 44 of the inner telescoping member 24 when the second threaded interface 14 is attached to the inner telescoping member 24. In an alternative embodiment, the first threaded interface 12 can be attached to the exposed end 50 of the inner telescoping member 24, while the second threaded interface 14 can be attached to the distal end 34 of the outer telescoping member 22.

The adjustable sprinkler riser 10 involves a simple manufacturing process. The protrusion 38 is formed on the outer telescoping member 22. Again, the protrusion 38 may be a ridge 40 integrally formed with the outer telescoping member 22.

The first joint member 16 is placed on the outer telescoping member 22 over the distal end 34 thereof such that it slidably interfaces with the outer telescoping member 22. The first threaded interface 12 is then attached to the distal end 34 of the outer telescoping member 22. A range of motion of the first joint member 16 relative to the outer telescoping member 22 is thus bounded by the first threaded interface 12 and the protrusion 38 on the outer telescoping member 22.

The pinching seal 20 is placed on the inner telescoping member 24 such that it slidably interfaces with the inner telescoping member 24. The second joint member 18 is placed on and slidably interfaces with the inner telescoping member 24. The pinching seal 20 is then positioned between the concealed end 52 of the inner telescoping member 24 and the second joint member 18. The second threaded interface 14 is attached to the exposed end 50 of the inner telescoping member 24. The inner telescoping member 24 is then positioned within the first interior channel 26 of the outer telescoping member 22 such that the outer and inner telescoping members telescopically interface 22, 24. Those skilled in the art will recognize that the order of performing the foregoing steps may be varied within the scope of this invention.

Figure 2:
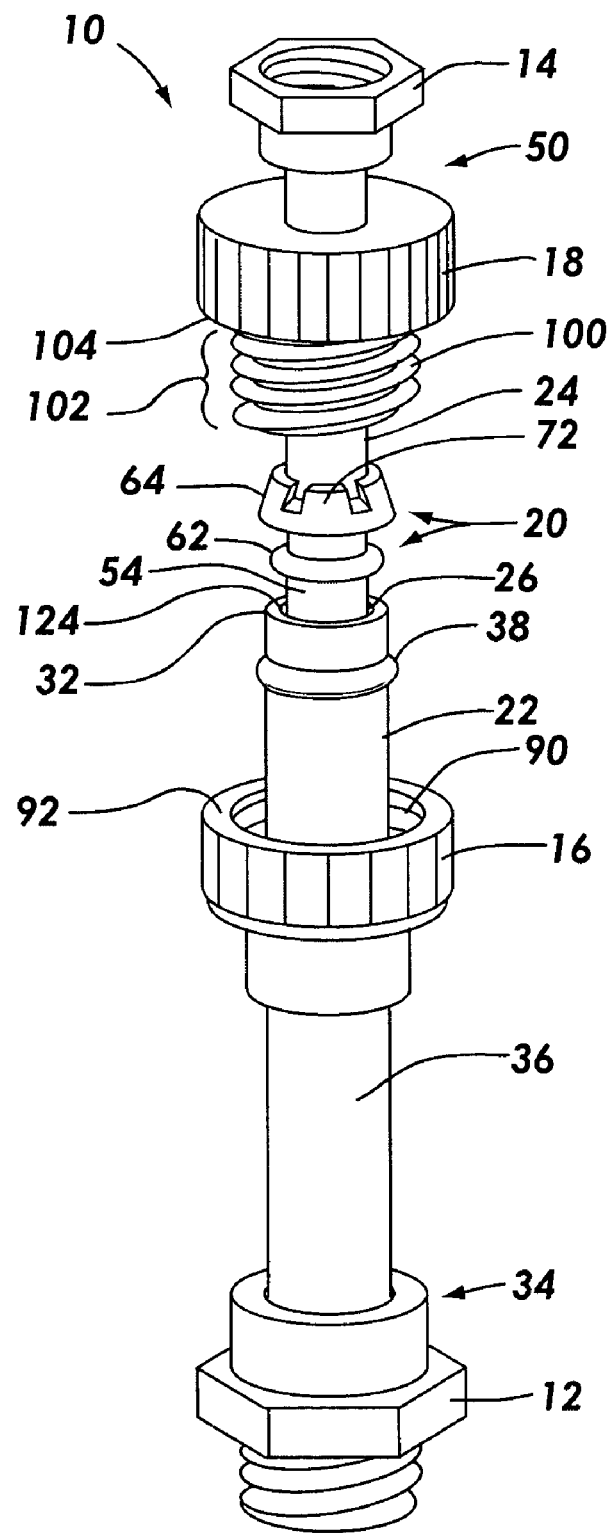
FIG. 2 is a perspective view of the adjustable sprinkler riser prior to locking engagement.

Referring to FIG. 2, a perspective view of the adjustable sprinkler riser 10 is illustrated. In this figure, the inner telescoping member 24 has been positioned within the first interior channel 26 of the outer telescoping member 22 such that the inner telescoping member 24 telescopically interfaces with the outer telescoping member 22. The concealed end 52 (shown in FIG. 1) of the inner telescoping member 24 is disposed within the first interior channel 26 of the outer telescoping member 22, while the exposed end 50 of the inner telescoping member 24 is situated outside of the first interior channel 26. The first threaded interface 12 is attached to the distal end 34 of the outer telescoping member 22, while the second threaded interface 14 is attached to the exposed end 50 of the inner telescoping member 24. The first, second, third, and fourth interior channels 26, 44, 110, 120 (shown in FIG. 1) are thus in fluid communication with each other.

The first joint member 16 is positioned over and encircles the outer surface 36 of the outer telescoping member 22 such that the first joint member 16 slidably interfaces with the outer telescoping member 22. A range of motion of the first joint member 16 relative to the outer telescoping member 22 is bounded by the first threaded interface 12 and the protrusion 38 on the outer telescoping member 22. The protrusion 38 is spaced from the proximal end 32 of the outer telescoping member 22. When the first joint member 16 contacts the protrusion 38, the first joint member 16 cannot be moved any closer to the proximal end 32 of the outer telescoping member 22. It is the contact with the protrusion 38 that prevents the first joint member 16 from extending any further toward the proximal end 32. The engagement end 92 and first set of threads 90 of the first joint member 16 are oriented toward the second joint member 18.

The second joint member 18 is positioned over and encircles the external surface 54 of the inner telescoping member 24 such that the second joint member 18 slidably interfaces with the inner telescoping member 24. The second set of threads 106 on the second joint member 18 is oriented toward the first joint member 16.

The pinching seal 20 has been placed on the external surface 54 such that the pinching seal 20 (the O-ring 62 and pinching member 64) slidably interfaces with the inner telescoping member 24. The pinching seal 20 is situated between the second joint member 18 and the proximal end 32 of the outer telescoping member 22. Accordingly, the pinching seal 20 can be positioned within the expanded section 100 of the second joint member 18.

The pinching member 64 is positioned between the second joint member 18 and the O-ring 62. As shown, the projections 72 of the pinching member 64 are oriented toward the second joint member 18. When attached to the first joint member 16, the second joint member 18 presses the O-ring 62 into an opening 124 between the outer and inner telescoping members 22, 24 to prevent pressurized fluid from leaking out of the opening 124.

Figure 3:
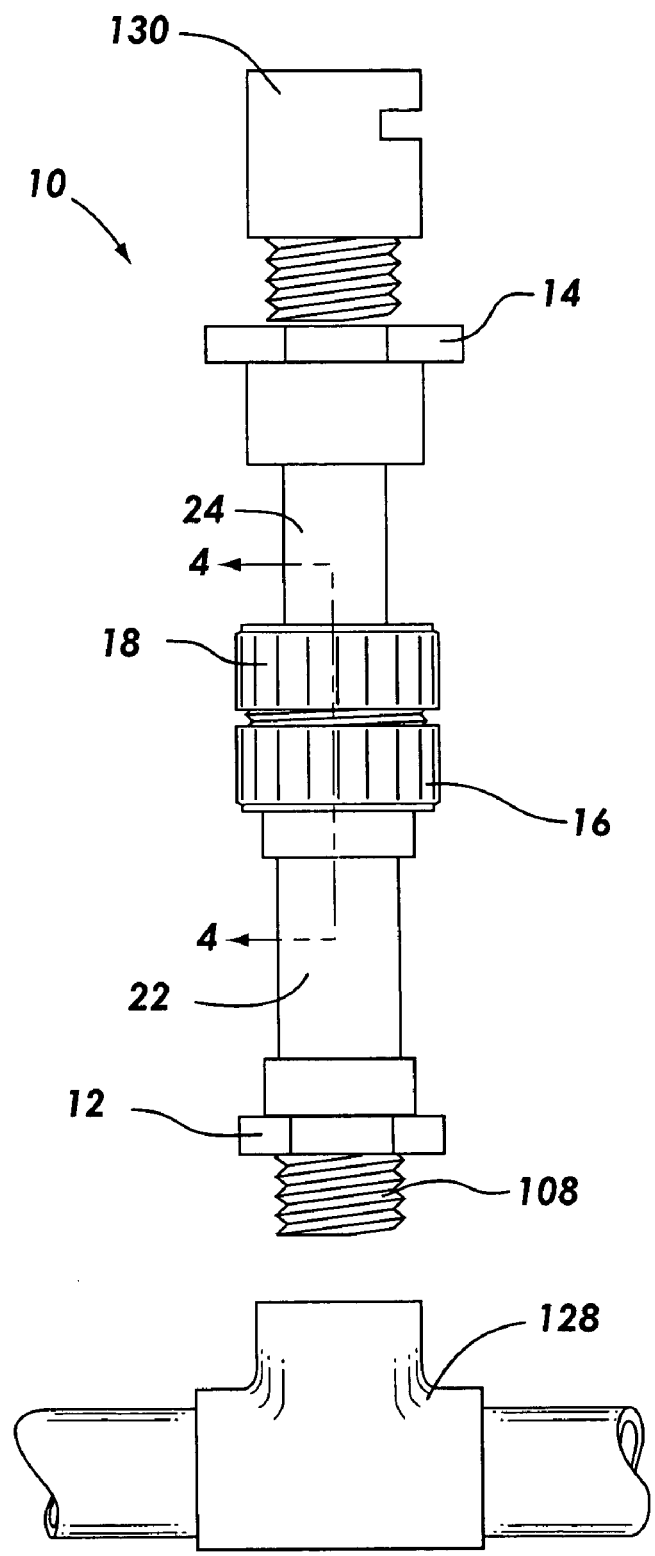
FIG. 3 is a side view of the adjustable sprinkler riser shown with a sprinkler system and a sprinkler head in locking engagement.

FIG. 3 is a side view of the adjustable sprinkler riser 10, together with a sprinkler system 128 and a sprinkler head 130. As shown, the first and second joint members 16, 18 have been secured to each other. The first joint member 16 engages the protrusion 38 (shown in FIG. 2), while the second joint member 18 engages the pinching seal 20 (also, shown in FIG. 2). Accordingly, movement of the inner telescoping member 24 relative to the outer telescoping member 22 is restricted, and a position of the inner telescoping member 24 relative to the outer telescoping member 22 is secured, as will be explained in greater detail below. To adjust the height of the sprinkler riser 10, a user loosens and separates the first and second joint members 16, 18 from each other, repositions the inner telescoping member 24, and then secures the first and second joint members 16, 18 to each other again.

As shown, the sprinkler riser 10 can be secured to a sprinkler system 128 using the third set of threads 108 on the first threaded interface 12. In addition, the sprinkler riser 10 can be secured to a sprinkler head 130 using the fourth set of threads 118 (shown in FIG. 1) on the second threaded interface 14. Of course, the third and fourth set of threads 108, 118 may face inwardly or outwardly, depending on the design of the sprinkler system 128 and sprinkler head 130. In an alternative embodiment, the first threaded interface 12 could be attached to the inner telescoping member 24, while the second threaded interface 14 could be attached to the outer telescoping member 22. Thus, in such an embodiment, the inner telescoping member 24 would be positioned proximate the sprinkler system 128, while the outer telescoping member 22 would be positioned proximate the sprinkler head 130.

Figure 4:
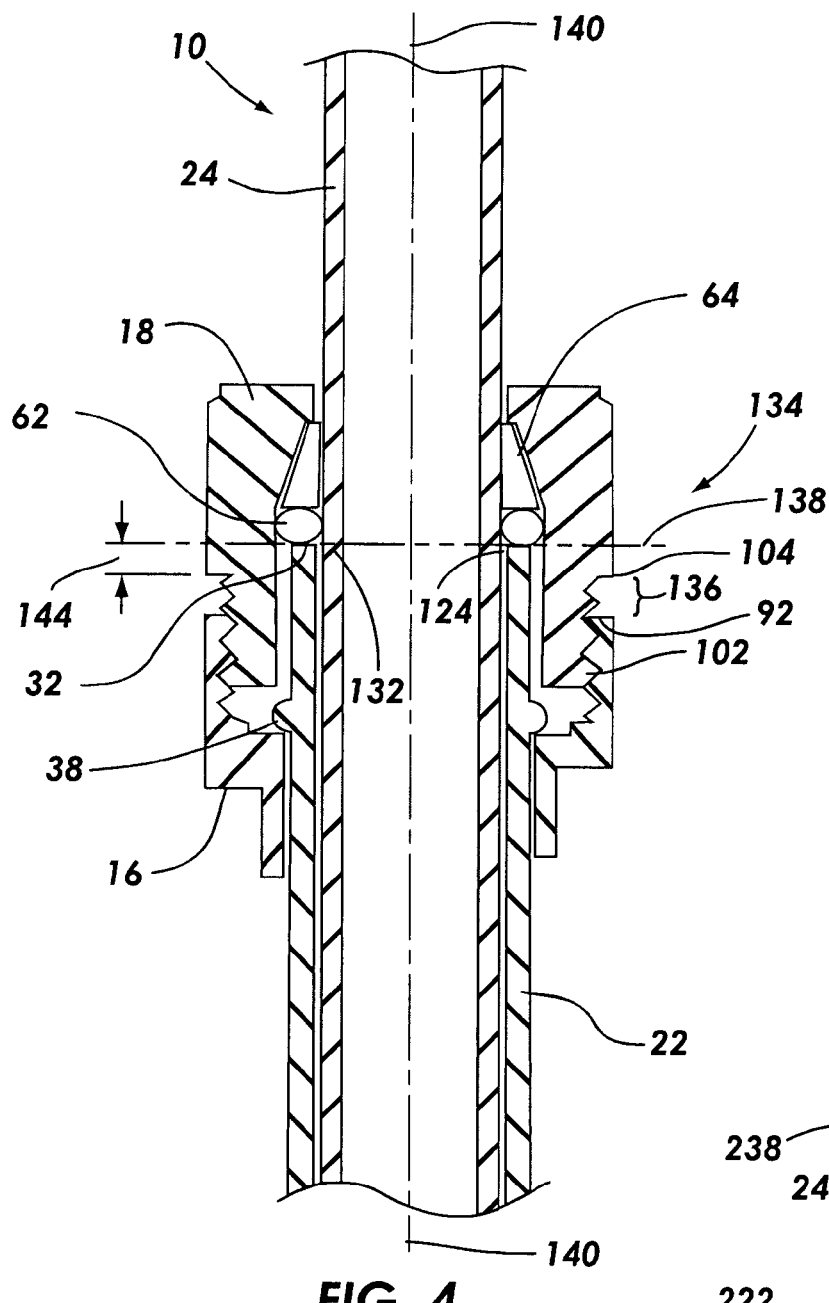
FIG. 4 an enlarged sectional view of the adjustable sprinkler rise along line 4—4, which is shown in FIG. 3.

FIG. 4 illustrates an enlarged sectional view of the adjustable sprinkler riser 10 along line 4—4, which is shown on FIG. 3. As in FIG. 3, FIG. 4 shows the sprinkler riser 10 when the second joint member 18 is secured to the first joint member 16. As a result, the first joint member 16 engages the protrusion 38 and pulls the second joint member 18 toward the first joint member 16. The second joint member 18 engages and constricts the pinching member 64, which, in turn, constricts the inner telescoping member 24 such that the position of the inner telescoping member 24 relative to the outer telescoping member 22 is secured. Also, the second joint member 18 presses the O-ring 62 into the opening 124 between the outer and inner telescoping members 22, 24 to prevent, or limit, pressurized fluid from leaking out of the opening 124.

One advantage of the adjustable sprinkler riser 10 is its strength or resistance to breakage. The inner telescoping member 24 is most vulnerable to bending or breakage where it contacts the proximal end 32 of the outer telescoping member 22. A blow to the inner telescoping member 24, particularly near the exposed end 50 (shown in FIG. 1), can apply significant force to this area 132 of vulnerability to breakage or bending. If the inner telescoping member 24 is bent, telescopic interaction between the outer and inner telescoping members 22, 24 will likely be impeded.

A combined joint 134, the first and second joint member 16, 18 when secured to each other, is particularly vulnerable to breakage at an exposed segment 136 of the second joint member 18 between the engagement end 92 of the first joint member 16 and the remote boundary 104 of the thin-walled section 102 of the second joint member 18. The exposed segment 136 of the second joint member 18 is where the first and second joint members 16, 18 no longer overlap each other, and, thus, the exposed segment 136 is particularly susceptible to breakage. The strength of the sprinkler riser 10 will be increased if the exposed segment 136 of the second joint member 18 is offset from the area 132 of vulnerability to breakage of the inner telescoping member 24.

As a consequence, when the second joint member 18 is secured to the first joint member 16 such that the position of the inner telescoping member 24 relative to the outer telescoping member 22 is secured, as shown in FIG. 4, the exposed segment 136 of the second joint member 18 is offset from the proximal end 32 of the outer telescoping member 22. In this application, offset means that an imaginary plane 138 projected away from the proximal end 32 of the outer telescoping member 22 does not intersect with the exposed segment 136 of the second joint member 18. The imaginary plane 138 is generally perpendicular to a longitudinal axis 140 of the sprinkler riser 10. In certain embodiments, an offset 144 between the engagement end 92 of the first joint member 16 and exposed segment 136 of the second joint member 18 is at least an eighth or a quarter of an inch.

As shown, the exposed segment 136 of the second joint member 18 is positioned between the proximal end 32 and the distal end 34 (shown in FIG. 1) of the outer telescoping member 22. Alternatively, the exposed segment 136 of the second joint member 18 could be positioned between the proximal end 32 of the outer telescoping member 22 and the exposed end 50 (shown in FIG. 1) of the inner telescoping member 24 when second joint member 18 is secured to the first joint member 16 to secure a position of the inner telescoping member 24 relative to the outer telescoping member 22. In other words, the exposed segment 136 of the second joint member 18 could be positioned above the imaginary plane 138 if the sprinkler riser 10 is oriented as shown in FIG. 4.

In other embodiments, the protrusion 38 is positioned on the outer telescoping member 22 such that the engagement end 92 of the first joint member 16 is prevented from extending to the proximal end 32, or the imaginary plane 138, of the outer telescoping member 22. In such an embodiment, the engagement end 92 of the first joint member 16 is prevented from passing through or even intersecting with the imaginary plane 138. In certain designs in which the engagement end 92 of the first joint member 16 is prevented from extending to the proximal end 32, the exposed segment 136 of the second joint member 18 is offset from the proximal end 32 of the outer telescoping member 22 when the second joint member 18 is secured to the first joint member 16 such that the position of the inner telescoping member 24 relative to the outer telescoping member 22 is secured. Thus, the exposed segment 136 of the second joint member 18 is positioned between the proximal end 32 and distal end 34 (shown in FIG. 1) of the outer telescoping member 22. The offset 144 between the exposed segment 136 of the second joint member 18 and proximal end 32 of the outer telescoping member 22 may be at least an eighth or a quarter of an inch in certain such embodiments.

As shown, the engagement end 92 of the first joint member 16 is not flush with the remote boundary 104 of the thin-walled section 102 of the second joint member 18. However, in an alternative embodiment, the engagement end 92 of the first joint member 16 is flush with, or abuts, the remote boundary 104 of the thin-walled section 102 of the second joint member 18 when the position of the inner telescoping member 24 relative to the outer telescoping member 22 is secured. In such a embodiment, the exposed segment 136 of the second joint member 18 is simply planar in shape.

Figure 5:
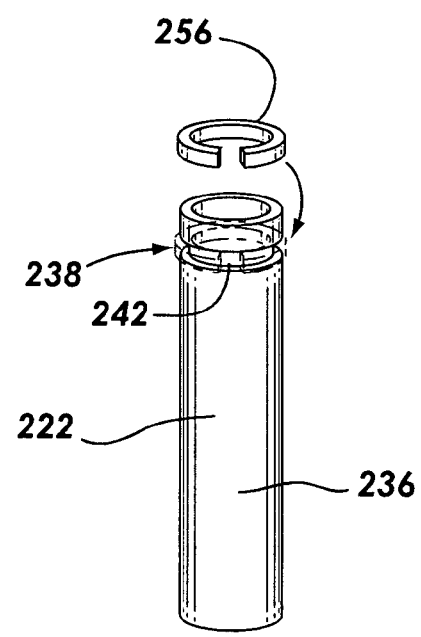
FIG. 5 is a perspective view of an alternative embodiment of an outer telescoping member of the adjustable sprinkler riser.

Referring now to FIG. 5, a perspective view of an alternative embodiment of an outer telescoping member 222 of the adjustable sprinkler riser 10 is shown. In this embodiment, the outer telescoping member 222 again has an outer surface 236 with a protrusion 238 (shown in phantom). The protrusion 238, however, is not formed by a ridge 40, which is shown in FIG. 1. Instead, a recess 242 is defined by the outer surface 236, and an open-sided ring 256 is then seated in the recess 242 to form the protrusion 238. Of course, the disclosed types of protrusions 38, 238 are not exhaustive. Those skilled in the art will recognized that the protrusion 38, 238 may be formed in various ways within the scope of this invention.

During the manufacturing process, the protrusion 38, 238 may be formed on the outer telescoping member 22, 222 in various positions. For instance, the protrusion 38 may be position such that there is an offset 144 (shown in FIG. 4)

between proximal end 32 of the outer telescoping member 22, 222 and the exposed segment 136 of the second joint member 18, as shown and discussed in connection with FIG. 4. Again, the offset 144 may be at least a specific length (e.g., an eighth or a quarter of an inch) and may involve embodiments in which the engagement end 92 of the first joint member 16 is prevented from extending to the proximal end 32 of the outer telescoping member 22, 222.

Other variations of the sprinkler riser 10 also come within the scope of this invention. For instance, the sprinkler riser 10 may be formed of various types of metals or plastics, which are known to those skilled in the art. Also, the telescoping members 22, 24, 222 illustrated in FIGS. 1–5 have a generally circular cross-sectional shape. However, the telescoping members 22, 24, 222 may have other cross-sectional shapes, such as octagonal, elliptical or square. In such embodiments, the first and second joint members 16, 18 could include an inner member (not shown) shaped to slidably interface with the telescoping members 22, 24, 222 and an outer rotating member (not shown) that rotates to allow the first and second joint members 16, 18 to threadably interface or otherwise interlock with each other.

In view of the foregoing, the adjustable sprinkler riser provides substantial advantages over conventional risers. When a position of the inner telescoping member relative to the outer telescoping member is secured, areas of vulnerability to breakage in the joint members and inner telescoping member are offset from each other to provide greater strength to the adjustable sprinkler riser. Also, the adjustable sprinkler riser involves a simple manufacturing process and is thus less expensive to manufacture than conventional adjustable risers.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An adjustable sprinkler riser comprising:
   an outer telescoping member having a proximal end and a protrusion spaced from the proximal end;
   an inner telescoping member that telescopically interfaces with the outer telescoping member;
   a first joint member that slidably interfaces with the outer telescoping member; and
   a second joint member that slidably interfaces with the inner telescoping member, wherein the second joint member may be selectably secured to the first joint member to secure a position and restrict movement of the inner telescoping member relative to the outer telescoping member, the first joint member engaging the protrusion when the first joint member is secured to the second joint member.

2. The adjustable sprinkler riser of claim 1, wherein the second joint member has a thin-walled section, the thin-walled section having a remote boundary, the first joint member having an engagement end dimensioned to receive the thin-walled section of the second joint member, and wherein an exposed segment of the second joint member between the engagement end of the first joint member and the remote boundary of the thin-walled section is offset from the proximal end of the outer telescoping member if the second joint member is secured to the first joint member such that the position of the inner telescoping member relative to the outer telescoping member is secured.

3. The adjustable sprinkler riser of claim 2, wherein the exposed segment of the second joint member is offset from the proximal end of the outer telescoping member by at least an eighth of an inch if the second joint member is secured to the first joint member such that the position of the inner telescoping member relative to the outer telescoping member is secured.

4. The adjustable sprinkler riser of claim 2, wherein the exposed segment of the second joint member is offset from the proximal end of the outer telescoping member by at least a quarter of an inch if the second joint member is secured to the first joint member such that the position of the inner telescoping member relative to the outer telescoping member is secured.

5. The adjustable sprinkler riser of claim 1, further comprising a pinching seal that is selectably positionable along a length of the inner telescoping member.

6. The adjustable sprinkler riser of claim 1, wherein the first joint member threadably interfaces with the second joint member.

7. The adjustable sprinkler riser of claim 1, further comprising a first threaded interface that is positioned on a distal end of the outer telescoping member and that secures the outer telescoping member to a sprinkler system.

8. The adjustable sprinkler riser of claim 1, further comprising a second threaded interface that is positioned on an exposed end of the inner telescoping member and that secures the inner telescoping member to a sprinkler head.

9. An adjustable sprinkler riser comprising:
   an outer telescoping member having a proximal end;
   an inner telescoping member that telescopically interfaces with the outer telescoping member;
   a first joint member that slidably interfaces with the outer telescoping member, the first joint member having an engagement end;
   a second joint member that slidably interfaces with the inner telescoping member, wherein the second joint member may be selectably secured to the first joint member to secure a position and restrict movement of the inner telescoping member relative to the outer telescoping member; and
   a protrusion positioned on the outer telescoping member that prevents the engagement end of the first joint member from extending to the proximal end of the outer telescoping member.

10. The adjustable sprinkler riser of claim 9, wherein the second joint member has a thin-walled section, the thin-walled section having a remote boundary, the engagement end of the first joint being dimensioned to receive the thin-walled section of the second joint member, and wherein an exposed segment of the second joint member between the engagement end of the first joint member and the remote boundary of the thin-walled section is offset from the proximal end of the outer telescoping member if the second joint member is secured to the first joint member such that the position of the inner telescoping member relative to the outer telescoping member is secured.

11. The adjustable sprinkler riser of claim 10, wherein the exposed segment of the second joint member is offset from the proximal end of the outer telescoping member by at least an eighth of an inch if the second joint member is secured to the first joint member such that the position of the inner telescoping member relative to the outer telescoping member is secured.

12. The adjustable sprinkler riser of claim 10, wherein the exposed segment of the second joint member is offset from the proximal end of the outer telescoping member by at least a quarter of an inch if the second joint member is secured to the first joint member such that the position of the inner telescoping member relative to the outer telescoping member is secured.

13. The adjustable sprinkler riser of claim 9, wherein the outer telescoping member and the inner telescoping member each have a generally cylindrical shape.

14. The adjustable sprinkler riser of claim 9, further comprising a pinching seal that is selectably positionable along a length of the inner telescoping member.

15. The adjustable sprinkler riser of claim 9, wherein the first joint member threadably interfaces with the second joint member.

16. The adjustable sprinkler riser of claim 9, further comprising a first threaded interface that is positioned on a distal end of the outer telescoping member and that secures the outer telescoping member to a sprinkler system.

17. The adjustable sprinkler riser of claim 9, further comprising a second threaded interface that is positioned on an exposed end of the inner telescoping member and that secures the inner telescoping member to a sprinkler head.

18. The adjustable sprinkler riser of claim 9, wherein the inner telescoping member and the outer telescoping member are made from metal.

19. The adjustable sprinkler riser of claim 9, wherein the inner telescoping member and the outer telescoping member are made from plastic.

20. The adjustable sprinkler riser of claim 9, wherein the protrusion comprises a ridge formed in the outer telescoping member.

21. The adjustable sprinkler riser of claim 9, wherein the protrusion comprises a recess formed in an outer surface of the outer telescoping member and an open-sided ring seated in the recess.

22. A method of manufacturing an adjustable sprinkler riser, the method comprising:
    placing a first joint member on an outer telescoping member, the first joint member slidably interfacing with the outer telescoping member;
    attaching a first threaded interface to a distal end of the outer telescoping member, wherein a range of motion of the first joint member relative to the outer telescoping member is bounded by the first threaded interface and a protrusion on the outer telescoping member;
    placing a second joint member on an inner telescoping member, the second joint member slidably interfacing with the inner telescoping member; and
    positioning the inner telescoping member within an inner channel defined by the outer telescoping member, the inner telescoping member telescopically interfacing with the outer telescoping member, wherein the second joint member may be selectably secured to the first joint member to secure a position and restrict movement of the inner telescoping member relative to the outer telescoping member.

23. The method of claim 22, further comprising forming a protrusion positioned on the outer telescoping member such that an exposed segment of the second joint member between a remote boundary of a thin-walled section of the second joint member and an engagement end of the first joint member is offset from a proximal end of the outer telescoping member if the second joint member is secured to the first joint member such that the position of the inner telescoping member relative to the outer telescoping member is secured.

24. The method of claim 22, further comprising forming a protrusion positioned on the outer telescoping member such that an exposed segment of the second joint member between a remote boundary of a thin-walled section of the second joint member and an engagement end of the first joint member is offset from a proximal end of the outer telescoping member by at least an eighth of an inch if the second joint member is secured to the first joint member such that the position of the inner telescoping member relative to the outer telescoping member is secured.

25. The method of claim 22, further comprising forming a protrusion positioned on the outer telescoping member such that an exposed segment of the second joint member between a remote boundary of a thin-walled section of the second joint member and an engagement end of the first joint member is offset from a proximal end of the outer telescoping member by at least a quarter of an inch if the second joint member is secured to the first joint member such that the position of the inner telescoping member relative to the outer telescoping member is secured.

26. The method of claim 22, further comprising attaching a second threaded interface to an exposed end of the inner telescoping member.

27. The method of claim 22, further comprising placing a pinching seal on the inner telescoping member, wherein the pinching seal is selectably positionable along a length of the inner telescoping member.

\* \* \* \* \*